(12) United States Patent
Schmadtke et al.

(10) Patent No.: US 12,447,721 B2
(45) Date of Patent: Oct. 21, 2025

(54) PROJECTION ASSEMBLY FOR A HEAD-UP DISPLAY (HUD) WITH P-POLARIZED RADIATION

(71) Applicant: SAINT-GOBAIN GLASS FRANCE, Courbevoie (FR)

(72) Inventors: Lisa Schmadtke, Würselen (DE); Stephan Gillessen, Alsdorf (DE); Jefferson Do Rosario, Aachen (DE); Jan Hagen, Bonn (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 229 days.

(21) Appl. No.: 18/252,106

(22) PCT Filed: Jan. 10, 2022

(86) PCT No.: PCT/EP2022/050322
§ 371 (c)(1),
(2) Date: May 8, 2023

(87) PCT Pub. No.: WO2022/157021
PCT Pub. Date: Jul. 28, 2022

(65) Prior Publication Data
US 2024/0009967 A1    Jan. 11, 2024

(30) Foreign Application Priority Data
Jan. 21, 2021   (EP) .................................... 21152651

(51) Int. Cl.
*B32B 17/10*    (2006.01)

(52) U.S. Cl.
CPC .. *B32B 17/10229* (2013.01); *B32B 17/10036* (2013.01); *B32B 17/1011* (2013.01);
(Continued)

(58) Field of Classification Search
CPC ........ B32B 17/10229; B32B 17/10036; B32B 17/1011; B32B 2307/202;
(Continued)

(56) References Cited

U.S. PATENT DOCUMENTS

| 2014/0192286 A1* | 7/2014 | Tasaka ................... G02B 5/208 |
| | | 349/185 |
| 2015/0291812 A1* | 10/2015 | Anapolsky .......... C03C 17/3644 |
| | | 427/596 |

(Continued)

FOREIGN PATENT DOCUMENTS

| CA | 2027348 A1 * | 4/1991 | ............. G02B 27/14 |
| CA | 2932770 C * | 8/2019 | ....... B32B 17/10036 |

(Continued)

OTHER PUBLICATIONS

International Search Report as issued in International Patent Application No. PCT/EP2022/050322, dated Mar. 7, 2022.

*Primary Examiner* — Stephen G Sherman
(74) *Attorney, Agent, or Firm* — Pillsbury Winthrop Shaw Pittman LLP

(57) ABSTRACT

A projection assembly for a head-up display (HUD), includes a windshield including an outer pane and an inner pane that are joined to one another via a thermoplastic intermediate layer, having a HUD region; and a projector that is directed at the HUD region and that emits p-polarized radiation; wherein a reflection coating is arranged on the surface of the outer pane or of the inner pane facing the intermediate layer or within the intermediate layer, which reflection coating is suitable for reflecting p-polarized radiation and which has exactly one electrically conductive layer based on silver; and an emissivity-reducing coating is arranged on the surface of the inner pane facing away from (Continued)

Figure 1:
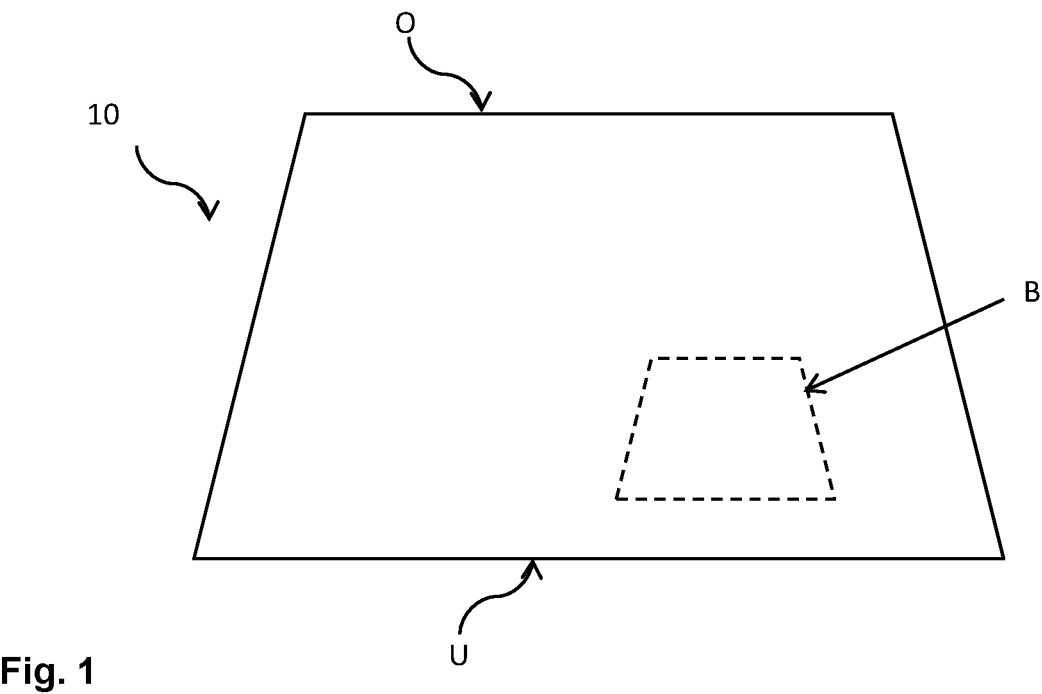

the intermediate layer, which coating has an electrically conductive layer based on a transparent conductive oxide.

19 Claims, 4 Drawing Sheets

(52) U.S. Cl.
CPC ... *B32B 2307/202* (2013.01); *B32B 2307/204* (2013.01); *B32B 2307/402* (2013.01); *B32B 2307/418* (2013.01); *B32B 2307/7376* (2023.05)

(58) Field of Classification Search
CPC ........ B32B 2307/204; B32B 2307/402; B32B 2307/418; B32B 2307/7376; B32B 2250/40; B32B 2255/10; B32B 2255/20; B32B 2255/205; B32B 2255/28; B32B 2307/4026; B32B 2307/412; B32B 2307/416; B32B 2457/20; B32B 2605/08; B32B 1/00; B32B 7/12; B32B 17/10201; B32B 17/10211; B32B 17/10449; B32B 17/1066; B32B 17/10761; B32B 17/1077; B32B 17/10788; B32B 17/10935; B32B 27/08; B32B 27/30; B32B 27/306; B32B 27/40; C03C 17/3435; C03C 17/36; C03C 17/3626; C03C 17/3644; C03C 17/366; C03C 17/3681; C03C 2217/948; C03C 2218/365; G02B 1/11; G02B 2027/012
See application file for complete search history.

(56) References Cited

U.S. PATENT DOCUMENTS

| | | | | |
|---|---|---|---|---|
| 2016/0303831 A1* | 10/2016 | Cloots | ............... | B32B 17/10036 |
| 2017/0242247 A1 | 8/2017 | Tso et al. | | |
| 2019/0329529 A1* | 10/2019 | Schulz | ............... | B32B 17/10174 |
| 2022/0017409 A1* | 1/2022 | Turkuz | ................ | C03C 17/3652 |

FOREIGN PATENT DOCUMENTS

| | | | | |
|---|---|---|---|---|
| CN | 104159861 A | 11/2014 | | |
| CN | 106630688 A | 5/2017 | | |
| CN | 106646874 A | 5/2017 | | |
| CN | 110520782 A | 11/2019 | | |
| CN | 111356949 A | 6/2020 | | |
| DE | 10 2014 220189 A1 | 4/2016 | | |
| EP | 1 880 243 A2 | 1/2008 | | |
| EP | 1 800 855 B1 | 2/2013 | | |
| WO | WO-0222516 A1 * | 3/2002 | ........... | C03C 17/245 |
| WO | WO 2006/122305 A2 | 11/2006 | | |
| WO | WO 2009/071135 A1 | 6/2009 | | |
| WO | WO 2013/131667 A1 | 9/2013 | | |
| WO | WO 2018/206236 A1 | 11/2018 | | |
| WO | WO 2019/046157 A1 | 3/2019 | | |
| WO | WO 2019/179683 A1 | 9/2019 | | |
| WO | WO 2020/094422 A1 | 5/2020 | | |
| WO | WO 2020/094423 A1 | 5/2020 | | |
| WO | WO-2020130981 A2 * | 6/2020 | ............. | C03C 17/36 |
| WO | WO 2021/004685 A1 | 1/2021 | | |
| WO | WO 2021/104800 A1 | 6/2021 | | |

\* cited by examiner

PROJECTION ASSEMBLY FOR A HEAD-UP DISPLAY (HUD) WITH P-POLARIZED RADIATION

CROSS-REFERENCE TO RELATED APPLICATIONS

This application is the U.S. National Stage of PCT/EP2022/050322, filed Jan. 10, 2022, which in turn claims priority to European patent application number 21152651.2 filed Jan. 21, 2021. The content of these applications are incorporated herein by reference in their entireties.

Modern automobiles are increasingly equipped with so-called head-up displays (HUDs). With a projector, typically in the region of the dashboard, images are projected onto the windshield, reflected there, and perceived by the driver as a virtual image behind the windshield (from his perspective). Thus, important data can be projected into the drivers field of vision, for example, the current driving speed, navigation or warning messages, which the driver can to perceive without having to take his eyes off the road. Head-up displays can thus contribute significantly to increasing traffic safety.

HUD projectors are predominantly operated with s-polarized radiation and irradiate the windshield with an angle of incidence of about 65% [sic: 65° ], which is near Brewster's angle for an air/glass transition (56.5° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP180085561, or EP1880243A2.

The wedge films are expensive such that production of such a composite pane for an HUD is quite cost intensive. Consequently, there is a need for HUD projection assemblies that work with windshields without wedge films. For example, it is possible to operate the HUD projector with p-polarized radiation, which is not significantly reflected by the pane surfaces. Instead, the windshield has a reflection coating as a reflection surface for the p-polarized radiation. DE102014220189A1 discloses such an HUD projection assembly that is operated with p-polarized radiation. Proposed, among other things, as a reflecting structure is a single metallic layer with a thickness from 5 nm to 9 nm, for example, made of silver or aluminum. WO2019046157A1 also discloses an HUD with p-polarized radiation, wherein a reflection coating with at least two metallic layers is used.

US2017242247A1 discloses another HUD projection assembly with a reflection coating für p-polarized radiation. The reflection coating can contain one or more conductive silver layers, as well as dielectric layers. However, in the relevant spectral range, the reflection spectrum has a significantly curved shape such that the reflectance is relatively highly wavelength dependent. This is disadvantageous with regard to a color-neutral display of the HUD projection.

A number of projection assemblies with better reflection properties have been proposed, with these reflection properties having been achieved in particular by optimizing the reflection coating. For example, in WO2019179683A1, WO2020094422A1, WO2020094423A1, reflection coatings with multiple silver layers were proposed.

WO2021004685A1 and the subsequently published WO2021104800A1 disclose reflection coatings with a single silver layer, with which good reflection properties for p-polarized radiation are achieved. Reflection coatings with a single silver layer have, compared to those with multiple silver layers, the advantage that they are less complex and can, consequently, be produced more easily and more economically.

Projection assemblies consisting of windshields and projectors with p-polarized radiation are known from CN106630688A and CN106646874A. In this case, the windshields carry, on the interior-side surface of the inner pane, a purely dielectric reflection coating for reflecting p-polarized radiation. In addition, the windshields are equipped with heatable coatings that contain silver layers.

Also known are vehicle panes that are equipped with emissivity-reducing coatings (so-called low-E coatings) that improve the thermal comfort in the interior of the vehicle by reflection of thermal radiation. Transparent emissivity-reducing coatings can contain, for example, a functional layer based on indium tin oxide (ITO). Reference is made, by way of example, to WO2013131667A1 and WO2018206236A1.

There is still a need for improved projection assemblies for HUDs that are operated with p-polarized radiation, wherein the windshield has further improved reflection behavior for p-polarized radiation. The windshield should, in particular, have high transmittance in the visible spectral range and high reflectivity for p-polarized radiation and allow a color-neutral display. In addition, the windshield should ensure high thermal comfort in the vehicle. The object of the present invention is to provide such an improved projection assembly.

The object of the present invention is accomplished according to the invention by a projection assembly in accordance with claim 1. Preferred embodiments are apparent from the dependent claims.

The core of the invention is the fact that the windshield is equipped with a combination of a reflection coating with exactly one silver layer and an emissivity-reducing coating with a TCO layer. P-polarized radiation is used to generate the HUD image. The reflection coating is provided for the purpose of reflecting the p-polarized radiation. Since the angle of incidence of about 65° typical for HUD projection assemblies is relatively close to Brewster's angle for an air/glass transition (56.5°, soda lime glass), p-polarized radiation is hardly reflected by the pane surfaces, but instead primarily by the conductive coating. Consequently, ghost images do not occur or are hardly perceptible such that the use of an expensive wedge film can be dispensed with. In addition, the HUD image is recognizable even for wearers of polarization-selective sunglasses, which typically allow only p-polarized radiation to pass through and block s-polarized radiation. The reflection coating according to the invention with a single silver layer is suitable for a good, color-neutral HUD display, which was already known per se. The single silver layer does not excessively reduce light transmittance such that the pane can still be used as a windshield. The inventors have now, surprisingly, found that the presence of the emissivity-reducing coating results in further improvement of the reflection properties, in particular in a smoothing of the reflection spectrum such that an even more color-neutral HUD display is made possible. In addition, the emissivity-reducing coating improves the thermal comfort in the vehicle by reducing the incoming irradiation from thermal radiation in the summer and the emission of heat in the winter. These are major advantages of the present invention.

The projection assembly according to the invention for a head-up display (HUD) includes at least a windshield and a projector (HUD projector). As is usual with HUDs, the projector irradiates a region of the windshield where the radiation is reflected in the direction of the viewer (driver), generating a virtual image, which the viewer perceives, from his perspective, as behind the windshield. The region of the windshield that can be irradiated by the projector is referred to as the HUD region. The beam direction of the projector can typically be varied by mirrors, in particular vertically, in order to adapt the projection to the body size of the viewer. The region in which the eyes of the viewer must be situated with a given mirror position is referred to as the "eyebox window". This eyebox window can be shifted vertically by readjustment of the mirrors, with the entire region thus available (i.e., the superimposing of all possible eyebox windows) referred to as the "eyebox". A viewer situated within the eyebox can perceive the virtual image. This, of course, means that the eyes of the viewer must be situated within the eyebox, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The windshield comprises an outer pane and an inner pane that are joined to one another via a thermoplastic intermediate layer. The windshield is intended, in a window opening of a vehicle to separate the interior from the external surroundings. In the context of the invention, the term "inner pane" refers to the pane of the windshield facing the vehicle interior. The term "outer pane" refers to the pane facing the external surroundings. The windshield is preferably the windshield of a motor vehicle, in particular of a passenger car ora truck.

The windshield has an upper edge and a lower edge as well as two side edges extending therebetween. "Upper edge" refers to that edge that is intended to point upward in the installed position. "Lower edge" refers to that edge that is intended to point downward in the installed position. The upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the external surroundings. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The projector is directed at the HUD region of the windshield. It irradiates the HUD region with radiation in the visible range of the electromagnetic spectrum to generate the HUD projection, in particular in the spectral range from 450 nm to 650 nm, for example, with the wavelengths of 473 nm, 550 nm, and 630 nm (RGB). According to the invention, the projector emits p-polarized radiation.

According to the invention, the windshield is provided with a reflection coating suitable for reflecting p-polarized radiation. As a result, a virtual image which the driver of the vehicle can perceive as behind the windshield from his perspective is generated from the projector radiation. The reflection coating has, according to the invention, exactly one electrically conductive layer based on silver. This electrically conductive layer can also be referred to simply as a "silver layer". It has been demonstrated that already with such comparatively simple reflection coatings, very good reflection properties can be achieved. The reflection coating is arranged in the interior of the windshield, as is customary with corrosion susceptible coatings with silver layers. The reflection coating can be arranged or applied applied on one to of the surfaces of the two panes facing the intermediate layer, i.e., the interior-side surface of the outer pane or the exterior-side surface of the inner pane. Alternatively, the reflection coating can also be arranged within the thermoplastic intermediate layer, for example, applied to a carrier film that is arranged between two thermoplastic bonding films.

The projector radiation directed at the windshield is primarily reflected at the reflection coating, i.e., the most intense reflection occurs at the reflection coating. In other words, the intensity of the projector radiation reflected at the reflection coating is higher than the intensity of the radiation reflected at any other interface, in particular, higher than the intensities of the projector radiation reflected at the interior-side surface of the inner pane and the exterior-side surface of the outer pane.

The reflection coating according to the invention has IR-reflecting properties due to the electrically conductive silver layer such that it functions as a sun shading coating that reduces the heating of the vehicle interior by reflecting infrared components of solar radiation, in particular in the near infrared range, for example, in the range from 800 nm to 1500 nm. The reflection coating can also be used as a heating coating if it is electrically contacted such that a current flows through it, which heats the reflection coating.

According to the invention, the windshield is also provided with an emissivity-reducing coating. Emissivity-reducing coatings are also known as thermal-radiation-reflecting coatings, low emissivity coatings, or low-E coatings (low emissivity). Emissivity refers to the measure that indicates how much thermal radiation the pane emits into an interior in the installed position compared to an ideal thermal radiator (a black body). Emissivity-reducing coatings have the function of preventing the radiation of heat into the interior (IR components of the solar radiation and in particular the thermal radiation of the pane itself) and also the radiation of heat out of the interior. They have reflecting properties for infrared radiation, in particular for thermal radiation in the spectral range from 5 µm-50 µm (see also standard DIN EN 12898:2019-06). This effectively improves the thermal comfort in the interior. When outside temperatures and solar radiation are high, the emissivity-reducing coatings can at least partially reflect the thermal radiation emitted by the entire pane in the direction of the interior. When outside temperatures are low, they can reflect thermal radiation radiated from the interior and thus reduce the effect of the cold pane as a heat sink. This is particularly advantageous for electric vehicles, which produce less waste heat that can be used to heat the interior.

According to the invention, the emissivity-reducing coating is arranged on the interior-side surface of the inner pane and has at least one, preferably exactly one, electrically conductive layer based on a transparent conductive oxide (TCO). This electrically conductive layer can also be referred to as a TCO layer.

In the spectral range from 450 nm to 650 nm, the windshield provided with the reflection coating and the emissivity-reducing coating preferably has an averaged reflectance for p-polarized radiation of at least 10%, particularly preferably of at least 15%. This produces a sufficiently high intensity projection image. The spectral range from 450 nm to 650 nm is used to characterize the reflection properties because of the wavelengths relevant for the HUD display (RGB: 473 nm, 550 nm, 630 nm). The high reflectance, along with a relatively simple layer structure, is a major advantage of the present invention. Particularly good results are achieved when the reflectance in the entire spectral range from 450 nm to 650 nm is at least 10%, preferably at least 15%, such that the reflectance in the specified spectral range is not below the specified values at any point.

Reflectance describes the proportion of the total incident radiation that is reflected. It is indicated in % (based on 100% incident radiation) or as a unitless number from 0 to 1 (normalized to the incident radiation). Plotted as a function of the wavelength, it forms the reflection spectrum. In the context of the present invention, the statements concerning reflectance relative to p-polarized radiation are based on the reflectance measured with an angle of incidence of 65° relative to the interior-side surface normal, which corresponds approx. to the irradiation by conventional projectors. The data regarding the reflectance or the reflection spectrum are based on a reflection measurement with a light source that emits uniformly with a normalized radiation intensity of 100% in the spectral range under consideration.

In order to achieve the most color-neutral display of the projector image possible, the reflection spectrum should be as smooth as possible and should have no pronounced local minima and maxima. In the spectral range from 450 nm to 650 nm, the difference between the maximally occurring reflectance and the mean of the reflectance as well as the difference between the minimally occurring reflectance and the mean of the reflectance in a preferred embodiment should be at most 1%, particularly preferably at most 0.5%, most particularly preferably at most 0.2%. Here again, the reflectance for p-polarized radiation is measured with an angle of incidence of 65° relative to the interior-side surface normal. The resultant difference is to be considered as the absolute deviation of reflectance (reported in %), not as a percentage deviation relative to the mean.

Alternatively, the standard deviation in the spectral range from 450 nm to 650 nm can be used as a measure of the smoothness of the reflection spectrum. It is preferably less than 1%, particularly preferably less than 0.5 most particularly preferably less than 0.2%.

It is particularly advantageous if the averaged reflectance in the entire visible spectral range from 380 nm to 780 nm is at least 10%, preferably at least 15%, and if the difference between the maximally occurring reflectance and the mean of the reflectance as well as the difference between the minimally occurring reflectance and the mean of the reflectance in this spectral range are at most 2%, preferably at most 1.5%. The standard deviation in the spectral range from 380 nm to 780 nm is preferably less than 1%, particularly preferably less than 0.5%. The smoothest possible reflection spectrum in the visible spectral range ensures a color-neutral overall impression of the windshield without any color cast.

The reflection coating is transparent, meaning, in the context of the invention, that it has average transmittance in the visible spectral range (380 nm to 780 nm) of at least 70%, preferably at least 80%, and thus does not substantially restrict vision through the pane. In principle, it suffices for the HUD region of the windshield to be provided with the reflection coating. However, other regions can also be provided with the reflection coating; and the windshield can be provided with the reflection coating essentially over its entire surface, which may be preferred for manufacturing reasons. In one embodiment of the invention, at least 80% of the pane surface is provided with the reflection coating according to the invention. In particular, the reflection coating is applied to the pane surface over its entire surface with the exception of a peripheral edge region and, optionally, a local region intended to ensure the transmittance of electromagnetic radiation through the windshield as communication windows, sensor windows, or camera windows, and, consequently, not provided with the reflection coating. The peripheral uncoated edge region has, for example, a width of up to 20 cm. It prevents direct contact of the reflection coating with the surrounding atmosphere such that the reflection coating is protected, inside the windshield, against corrosion and damage. The reflection coating is particularly preferably on the exterior-side surface of the inner pane, because the radiation then has to travel the shortest possible distance through the windshield before it strikes the reflection coating. This is advantageous in terms of the quality of the HUD image.

The reflection coating is a thin-layer stack, i.e., a layer sequence of thin individual layers. This thin-layer stack contains exactly one electrically conductive layer based on silver. The electrically conductive layer based on silver gives the reflection coating the basic reflecting properties and also an IR-reflecting effect and electrical conductivity. The reflection coating contains exactly one silver layer, i.e., not more than one silver layer; and also no further silver layers are arranged above or below the reflection coating. It is a particular advantage of the present invention that the desired reflection properties can be achieved with one silver layer without excessively reducing the transmittance, as would be the case if multiple conductive layers were used. However, it is also possible for other electrically conductive layers to be present that do not substantially contribute to the electrical conductivity of the reflection coating but serve a different purpose. This applies in particular to metallic blocking layers with geometric thicknesses less than 1 nm, which are preferably arranged between the silver layer and the dielectric layer sequences.

The electrically conductive layer is based on silver (Ag). The conductive layer preferably contains at least 90 wt-% silver, particularly preferably at least 99 wt-% silver, most particularly preferably at least 99.9 wt-% silver. The silver layer can have dopants, for example, palladium, gold, copper, or aluminum. The geometric layer thickness of the silver layer is preferably at most 15 nm, particularly preferably at most 14 nm, most particularly preferably at most 13 nm. As a result, advantageous reflectivity can be achieved in the IR range without excessively reducing transmittance. The geometric layer thickness of the silver layer is preferably at least nm, particularly preferably at least 8 nm. Thinner silver layers can lead to dewetting of the layer structure. Particularly preferably, the geometric layer thickness of the silver layer is from nm to 14 nm or from 11 nm to 13 nm.

The invention is not limited to a specific embodiment of the reflection coating. Rather, the reflection coating can be freely selected by the person skilled in the art according to the requirements in the individual case, provided it has a single silver layer. Typically, a lower dielectric layer or layer sequence is arranged below the silver layer. Likewise, an upper dielectric layer or layer sequence is typically arranged above the silver layer. The optical properties of the reflection coating, in particular the spectra of transmittance and reflection, can be influenced by the person skilled in the art, in particular by the layer structure, i.e., by the selection of the materials and thicknesses of the individual layers and the structure of the dielectric layer sequences. The reflection coating can thus be suitably adjusted. Preferred embodiments of the reflection coating, with which particularly good results are achieved, are described in the following.

In the context of the present invention, refractive indices are, in principle, indicated in relation to a wavelength of 550 nm. The refractive index is, in principle, independent of the measurement method; it can, for example, be determined by ellipsometery. Ellipsometers are commercially available, for example, from the company Sentech. The optical thickness is the product of the geometric thickness and the refractive index (at 550 nm). The optical thickness of a layer sequence is calculated as the sum of the optical thicknesses of the individual layers.

In the context of the invention, if a first layer is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer.

When a layer (thin layer) of a coating is based on a material, the layer consists for the most part of this material, in particular substantially of this material in addition to any impurities or dopants.

In an advantageous embodiment, the upper and the lower dielectric layer or layer sequence have in each case a refractive index of at least 1.9. This makes it possible to achieve high reflectivity for p-polarized radiation in the spectral range from 450 nm to 650 nm, which is relevant for HUD displays (HUD projectors typically operate with the wavelengths 473 nm, 550 nm, and 630 nm (RGB)). As a result, a high-intensity HUD image is achieved. Preferably, the ratio of the optical thickness of the upper dielectric layer or layer sequence to the optical thickness of the lower dielectric layer or layer sequence at least 1.7. It has surprisingly been shown that this asymmetry of the optical thicknesses results in a significantly smoother reflection spectrum for p-polarized radiation such that there is relatively constant reflectance over the entire relevant spectral range (450 nm to 650 nm). As a result, a color-neutral display of the HUD projection is ensured. The ratio of the optical thicknesses is calculated as the quotient of the optical thickness of the upper dielectric layer or layer sequence (dividend) divided by the optical thickness of the lower dielectric layer or layer sequence (divisor). In a particularly preferred embodiment, the ratio of the optical thickness of the upper dielectric layer or layer sequence to the optical thickness of the lower dielectric layer or layer sequence is at least 1.8, particularly preferably at least 1.9. Particularly good results are achieved with this.

In a particularly advantageous embodiment, the reflection coating includes no dielectric layers whose refractive index is less than 1.9. In other words, all dielectric layers of the reflection coating have a refractive index of at least 1.9. It is a particular advantage of the present invention that the desired reflection properties can be achieved with relatively high-refractive-index dielectric layers alone. Since silicon oxide layers that have low deposition rates in magnetron enhanced cathodic deposition are, in particular, considered for low-refractive-index layers with a refractive index of less than 1.9, the reflection coating according to the invention can thus be produced quickly and economically.

The reflection coating typically contains, above and below the silver layer, independently of one another in each case, a dielectric layer or a dielectric layer sequence with a refractive index of at least 1.9. The dielectric layers can, for example, be based on silicon nitride, zinc oxide, tin zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron. The dopants can provide inherently dielectric materials with a certain electrical conductivity. The person skilled in the art will nevertheless identify them as dielectric layers in terms of their function, as is usual in the field of thin layers. The material of the dielectric layers preferably has electrical conductivity (reciprocal of specific resistance) of less than $10^{-4}$ S/m. The material of the electrically conductive layers preferably has electrical conductivity greater than $10^4$ S/m.

The optical thickness of the upper dielectric layer or layer sequence is preferably from 100 nm to 200 nm, particularly preferably from 130 nm to 180 nm, most particularly preferably from 160 nm to 180 nm. The optical thickness of the lower dielectric layer or layer sequence is preferably from 50 nm to 120 nm, particularly preferably from 50 nm to 100 nm or from 80 nm to 120 nm, most particularly preferably from 80 nm to 100 nm. Particularly good results are achieved with this.

In a particularly advantageous embodiment, a dielectric layer, which can be referred to as an antireflection layer and is preferably based on an oxide, for example, tin oxide, and/or a nitride, for example, silicon nitride, particularly preferably based on silicon nitride ($Si_3N_4$), is, in each case, arranged above and below the silver layer. Silicon nitride has proved to be a good choice due to its optical properties, its easy availability, and its high mechanical and chemical stability. The silicon is preferably doped, for example, with aluminum or boron. In the case of dielectric layer sequences, the silicon nitride based layer is preferably the top layer of the upper layer sequence or the bottom layer of the lower layer sequence. The geometric thickness of the upper antireflection layer is preferably from 50 nm to 100 nm, particularly preferably from nm to 80 nm, in particular from 60 nm to 70 nm. The geometric thickness of the lower antireflection layer is preferably from 10 nm to 50 nm, particularly preferably from 15 nm to nm, most particularly preferably from 20 nm to 35 nm, in particular from 20 nm to 30 nm.

In addition to the antireflection layer, further dielectric layers with a refractive index of at least 1.9 can optionally be present. Thus, the upper and lower layer sequence can, independently of one another, contain a matching layer to improve the reflectivity of the silver layer. The matching layers are preferably based on zinc oxide (ZnO), particularly preferably zinc oxide $ZnO_{1-\delta}$ with $0 \leq \delta \leq 0.01$. The matching layers preferably further contain dopants. The matching layers can, for example, contain aluminum-doped zinc oxide (ZnO:Al). The zinc oxide is preferably deposited substoichiometrically in terms of oxygen in order to avoid reaction of excess oxygen with the silver-containing layer. The matching layers are preferably arranged between the silver layer and the antireflection layer. The geometric thickness of the matching layer is preferably from 5 nm to 30 nm, particularly preferably from 8 nm to 12 nm.

Refractive-index-enhancing layers that have a higher refractive index than the antireflection layer can also be present, likewise independently of one another, in the upper and lower layer sequence. This can further improve and fine-tune the optical properties, in particular the reflection properties. The refractive-index-enhancing layers preferably contain a mixed silicon-metal nitride, such as mixed silicon-zirconium nitride, mixed silicon-aluminum nitride, mixed silicon-titanium nitride, or mixed silicon-hafnium nitride (SiHfN), particularly preferably mixed silicon-zirconium nitride (SiZrN). The proportion of zirconium is preferably between 15 and 45 wt-%, particularly preferably between 15 and 30 wt-%. Alternative materials can be, for example, $WO_3$, $Nb_2O_5$, $Bi_2O_3$, $TiO_2$, and/or AlN. The refractive-index-enhancing layers are preferably arranged between the antireflection layer and the silver layer or between the matching layer (if present) and the antireflection layer. The geometric thickness of the refractive-index-enhancing layers is preferably from 5 nm to 30 nm, particularly preferably from 5 nm to 15 nm.

In one embodiment of the reflection coating, exactly one lower dielectric layer with a refractive index of at least 1.9, preferably based on silicon nitride, is arranged below the electrically conductive layer. Likewise, exactly one upper dielectric layer with a refractive index of at least 1.9, preferably based on silicon nitride, is arranged above the electrically conductive layer. This results in the layer sequence, starting from the substrate: lower antireflection layer—silver layer—upper antireflection layer. The reflection coating preferably does not contain any other dielectric layers.

In another embodiment of the reflection coating, a first lower dielectric layer (antireflection layer) and a second lower dielectric layer (matching layer) are arranged in the reflection coating below the electrically conductive layer. Likewise, a first upper dielectric layer (antireflection layer) and a second upper dielectric layer (matching layer) are arranged above the electrically conductive layer. The antireflection and matching layers have a refractive index of at least 1.9. The antireflection layers are preferably based on silicon nitride; the matching layers, on zinc oxide. The matching layers are preferably arranged between the respective antireflection layer and the silver layer: This results in the layer sequence, starting from the substrate: lower antireflection layer—lower matching layer—silver layer—upper matching layer—upper antireflection layer. The reflection coating preferably does not contain any other dielectric layers.

In another embodiment of the reflection coating, a first lower dielectric layer (antireflection layer), a second lower dielectric layer (matching layer), and a third lower dielectric layer (refractive-index-enhancing layer) are arranged below the electrically conductive layer. Likewise, a first upper dielectric layer (antireflection layer), a second upper dielectric layer (matching layer), and a third upper dielectric layer (refractive-index-enhancing layer) are arranged above the electrically conductive layer. The antireflection and matching layers and the refractive-index-enhancing layers have a refractive index of at least 1.9. The refractive-index-enhancing layers have a higher refractive index than the antireflection layers, preferably at least 2.1. The antireflection layers are preferably based on silicon nitride; the matching layers, based on zinc oxide; the refractive-index-enhancing layers, based on a mixed silicon-metal nitride, such as mixed silicon-zirconium nitride or mixed silicon-hafnium nitride. The matching layers preferably have the least distance from the silver layer, while the refractive-index-enhancing layers are arranged between the matching layers and the antireflection layers. This results in the layer sequence, starting from the substrate: lower antireflection layer—lower refractive-index-enhancing layer—lower matching layer—silver layer—upper matching layer—upper refractive-index-enhancing layer—upper antireflection layer. The reflection coating preferably does not contain any other dielectric layers.

Since the upper and the lower dielectric layer sequence can be formed independently of one another, combinations of the above described embodiments are also possible wherein the upper dielectric layer/layer sequence is formed according to one embodiment and the lower dielectric layer/layer sequence is formed according to a different one.

In an advantageous embodiment, the reflection coating includes at least one metallic blocking layer. The blocking layer can be arranged below and/or above the silver layer and preferably makes direct contact with the silver layer. The blocking layer is then positioned between the silver layer and the dielectric layer/layer sequence. The blocking layer serves as oxidation protection for the silver layer in particular during temperature treatments of the coated pane, as typically occur during bending processes. The blocking layer preferably has a geometric thickness less than 1 nm, for example, 0.1 nm to 0.5 nm. The blocking layer is preferably based on titanium (Ti) or a nickel-chromium alloy (NiCr). The blocking layer is particularly effective directly above the silver layer, as a result of which, in a preferred embodiment the reflection coating has a blocking layer above the silver layer and no blocking layer below the silver layer. The silver layer then makes direct contact with the lower dielectric layer (sequence) and indirect contact with the upper dielectric layer (sequence) via the blocking layer. The blocking layer changes the optical properties of the reflection coating only insignificantly and is preferably present in all the embodiments described above. Particularly preferably, the blocking layer is arranged directly above the silver layer, i.e., between the silver layer and the upper dielectric layer (sequence), where it is particularly effective.

In a particularly advantageous embodiment, the reflection coating includes or consists of the following individual layers, starting from the substrate surface:
- a lower antireflection layer, preferably based on $Si_3N_4$, preferably with a geometric thickness from 20 nm to 30 nm,
- a lower refractive-index-enhancing layer, preferably based on SiZrN or SiHfN, preferably with a geometric thickness from 8 nm to 12 nm,
- a lower matching layer, preferably based on ZnO, preferably with a geometric thickness from 8 nm to 12 nm,
- the silver layer, preferably with a thickness from 11 nm to 13 nm,
- a blocking layer, preferably based on Ti or NiCr, preferably with a geometric thickness from 0.1 nm to 0.5 nm,
- an upper matching layer, preferably based on ZnO, preferably with a geometric thickness from 8 nm to 12 nm,
- an upper refractive-index-enhancing layer, preferably based on SiZrN or SiHfN, preferably with a geometric thickness from 8 nm to 12 nm,
- an upper antireflection layer, preferably based on $Si_3N_4$, preferably with a geometric thickness from 60 nm to 70 nm.

The emissivity-reducing coating according to the invention is also transparent, i.e., it has average transmittance in the visible spectral range of at least 70%, preferably at least 80%. The emissivity-reducing coating is typically applied to the entire surface of the substrate surface, possibly with the exception of a peripheral edge region and/or another locally limited region that can be used, for example, for data transmission. The coated portion of the substrate surface is preferably at least 80%.

According to the invention, the emissivity-reducing coating has an electrically conductive TCO layer. Such layers are corrosion resistant and can be used on exposed surfaces. The refractive index of the TCO layer is preferably from 1.7 to 2.3. The electrically conductive layer is preferably based on indium tin oxide (ITO), which has proved particularly useful, in particular due to low specific resistance and low scattering with respect to sheet resistance. Alternatively, however, the conductive layer can, for example, also be based on mixed indium-zinc oxide (IZO), gallium-doped tin oxide (GZO), fluorine-doped tin oxide (FTO, $SnO_2$:F), antimony-doped tin oxide (ATO, $SnO_2$:Sb), or niobium doped titanium oxide ($TiO_2$:Nb).

The thickness of the TCO layer is preferably from 50 nm to 130 nm, particularly preferably from 60 nm to 100 nm, for example, from 65 nm to 80 nm. Particularly good results are thus achieved in terms of electrical conductivity with, at the same time, sufficient optical transparency.

Also, with regard to the emissivity-reducing coating, the invention is not limited to a specific embodiment, provided it has a TCO layer. Typically, a dielectric layer or layer sequence is arranged below and/or above the TCO layer, significantly influencing the optical properties, in particular the transmittance and reflectivity. The emissivity-reducing coating is then also a thin layer stack, i.e., a layer sequence of thin individual layers. Preferred embodiments of the emissivity-reducing coating with which particularly good results are achieved are described in the following.

So-called antireflection layers, which have a lower refractive index than the TCO layer and are arranged below as well as above it, have a particular influence on the optical properties. These antireflection layers can, in particular as a result of interference effects, increase transmittance through the pane and reduce reflectivity. The effect depends crucially on the refractive index and layer thicknesses.

In an advantageous embodiment, the emissivity-reducing coating includes a dielectric lower antireflection layer that is arranged below the TCO layer. The refractive index of the lower antireflection layer is preferably at most 1.8, for example, from 1.3 to 1.8, particularly preferably at most 1.6, for example, from 1.3 to 1.6. The thickness of the lower antireflection layer is preferably from 5 nm to 50 nm, preferably from 10 nm to 30 nm, for example, from nm to 20 nm.

In an advantageous embodiment, the emissivity-reducing coating includes a dielectric upper antireflection layer that is arranged above the TCO layer. The refractive index of the upper antireflection layer is preferably at most 1.8, for example, from 1.3 to 1.8, particularly preferably at most 1.6, for example, from 1.3 to 1.6. The thickness of the upper antireflection layer is preferably from 10 nm to 100 nm, particularly preferably from 30 nm to 70 nm, for example, from 45 nm to 55 nm.

In a particularly advantageous embodiment, the emissivity-reducing coating has both a lower antireflection layer below the TCO layer and also an upper antireflection layer above the TCO layer.

In particular, the antireflection layers produce advantageous optical properties of the pane. They increases the transparency of the windshield and promote a neutral color impression. The antireflection layers are preferably based on an oxide or fluoride, particularly preferably based on silicon oxide, magnesium fluoride, or calcium fluoride, in particular based on silicon oxide ($SiO_2$). The silicon oxide can have dopants and is preferably doped with aluminum ($SiO_2$:Al), with boron ($SiO_2$:B), with titanium ($SiO_2$:Ti), or with zirconium ($SiO_2$:Zr).

The upper antireflection layer can be the uppermost layer of the coating sein. It then has the greatest distance from the substrate surface (interior-side surface of the inner pane) and is the final layer of the layer stack, which is exposed and accessible and touchable for people. However it is also possible for one or more additional individual layers to be arranged above the upper antireflection layer. Such an additional layer can, for example, be used to improve the scratch protection and can be based on zirconium oxide, titanium oxide, or hafnium oxide.

It is been shown that the oxygen content of the TCO layer has a significant influence on its properties, in particular on transparency and conductivity. Production of the pane typically includes a temperature treatment, for example, a thermal toughening process and/or a bending process, whereby oxygen can diffuse to the TCO layer and can oxidize it. In an advantageous embodiment, the emissivity-reducing coating includes, between the TCO layer and the upper antireflection layer, a dielectric barrier layer for regulating oxygen diffusion with a refractive index of at least 1.9. The barrier layer serves to adjust the oxygen supply to an optimum level. Particularly good results are achieved when the refractive index of the barrier layer is from 1.9 to 2.5.

The dielectric barrier layer for regulating oxygen diffusion is preferably based on a nitride or a carbide. The barrier layer can, for example, be based on a nitride or carbide of tungsten, niobium, tantalum, zirconium, hafnium, chromium, titanium, silicon, or aluminum. In a preferred embodiment, the barrier layer is based on silicon nitride or silicon carbide, in particular silicon nitride ($Si_3N_4$), with which particularly good results are achieved. The silicon nitride can have dopants and, in a preferred further development, is doped with aluminum ($Si_3N_4$:Al), with zirconium ($Si_3N_4$:Zr), with titanium ($Si_3N_4$:Ti), or with boron ($Si_3N_4$:B). During a temperature treatment after application of the coating according to the invention, the coating according to the invention can be partially oxidized. A barrier layer deposited as $Si_3N_4$ then contains $Si_xN_yO_z$ after the temperature treatment, with the oxygen content typically being from 0 atomic-% to 35 atomic-%.

The thickness of the barrier layer is preferably from 5 nm to 20 nm, particularly preferably from 7 nm to 15 nm, most particularly preferably from 7 nm to 12 nm, for example, from 8 nm to 12 nm, or from 8 nm to 10 nm. The oxygen content of the TCO layer is thus particularly advantageously regulated. The thickness of the barrier layer is selected based on oxygen diffusion less than on the optical properties of the pane. However, it has been shown that barrier layers with thicknesses in the range indicated are compatible with the emissivity-reducing coating according to the invention and its optical requirements.

In an advantageous embodiment, the emissivity-reducing coating includes, below the TCO layer and, optionally, below the lower antireflection layer, a dielectric blocking layer against alkali diffusion. The blocking layer reduces or prevents the diffusion of alkali ions out of the glass substrate into the layer system. Alkali ions can negatively affect the properties of the coating. Furthermore, in interaction with the lower antireflection layer, the blocking layer contributes advantageously to the adjustment of the optics of the entire layer structure. The refractive index of the blocking layer is preferably at least 1.9. Particularly good results are achieved when the refractive index of the blocking layer is from 1.9 to 2.5. The blocking layer is preferably based on an oxide, a nitride, or a carbide, preferably of tungsten, chromium, niobium, tantalum, zirconium, hafnium, titanium, silicon or aluminum, for example, oxides such as $WO_3$, $Nb_2O_5$, $Bi_2O_3$, $TiO_2$, $Ta_2O_5$, $Y_2O_3$, $ZrO_2$, $HfO_2$ $SnO_2$, or $ZnSnO_x$, or nitrides such as AlN. The blocking layer is particularly preferably based on silicon nitride ($Si_3N_4$), with which particularly good results are achieved. The silicon nitride can have dopants and is, in a preferred further development, doped with aluminum ($Si_3N_4$:Al), with titanium ($Si_3N_4$:Ti), with zirconium ($Si_3N_4$:Zr), or with boron ($Si_3N_4$:B). The thickness of the blocking layer is preferably from 10 nm to 50 nm, particularly preferably from 20 nm to 40 nm, for example, from 25 nm to nm. The blocking layer is preferably the lowest layer of the layer stack, i.e., has direct contact with the substrate surface, where it can optimally develop its effects.

In a particularly preferred embodiment, the coating consists only of the layers described and does not contain any other layers. The emissivity-reducing coating then consists of the following layers in the order indicated starting from the substrate surface (interior-side surface of the inner pane):

blocking layer against alkali diffusion
lower antireflection layer
electrically conductive e TCO layer
barrier layer for regulating oxygen diffusion
upper antireflection layer In one embodiment der invention, the windshield has a region in which the thermoplastic intermediate layer is tinted or colored. This occurs in particular in so-called panorama windshields, which are elongated in the direction of the upper edge compared to conventional windshields, have strong curvature there, and extend, as it were, into the roof region of the vehicle. Such a panorama windshield gives the vehicle occupants a feeling of "openness". In this case, the region with the tinted intermediate layer is arranged above the central field of vision, i.e., between the central field of vision and the upper edge of the windshield, in particular the upper edge or an opaque masking print adjacent the upper edge. Here, "central field of vision" means the field of vision B in accordance with Regulation No. 43 of the United Nations Economic Commission for Europe (UN/ECE) (ECE-R43, "Uniform Conditions for the Approval of Safety Glazing Materials and Their Installation in Vehicles"). The field of vision B is defined there in Annex 18. In said region, the intermediate layer can have a tinting gradient, wherein, for example, the degree of tinting becomes stronger from the bottom toward the upper edge, and light transmittance through the windshield becomes lower, as a result. In said tinted region, the light transmittance (total transmittance per ECE-R 43) is, at least in some sections, preferably less than 70%, particularly preferably less than 50%, most particularly preferably less than 30%, and in particular less than 10%. The tinted region of the intermediate layer can, for example, be produced by using a section of a tinted polymer film instead of a clear polymer film. Alternatively, a tinted film can also be placed on the clear PVB film.

The tinted region has strengthened absorption of solar radiation and thus heats up more. This can lead to heating of the vehicle interior as a result of emission of thermal radiation. The emissivity-reducing coating according to the invention reduces this effect and improves thermal comfort. The advantages of the invention are, consequently, particularly pronounced in the case of such a pane.

The projector is arranged on the interior side of the windshield and irradiates the windshield via the interior-side surface of the inner pane. It is directed toward the HUD region and irradiates it to generate the HUD projection. The radiation of the projector is at least partially p-polarized, i.e., has a p-polarized radiation component. The radiation of the projector is preferably predominantly p-polarized, i.e., has a p-polarized radiation component than 50%. The higher the proportion of the p-polarized radiation in the total radiation of the projector, the stronger the intensity of the desired projection image and the weaker the intensity of the undesired reflections on the surfaces of the windshield. The p-polarized radiation component of the projector is preferably at least 70%, particularly preferably at least 80%, and in particular at least 90%. In a particularly advantageous embodiment, the radiation of the projector is essentially purely p-polarized—the p-polarized radiation component is thus 100% or deviates only insignificantly therefrom. The indication of the polarization direction is based on the plane of incidence of the radiation on the windshield. The expression "p-polarized radiation" refers to radiation whose electric field oscillates in the plane of incidence. "S-polarized radiation" refers to radiation whose electric field oscillates perpendicular to the plane of incidence. The plane of incidence is generated by the vector of incidence and the surface normal of the windshield in the geometric center of the irradiated region.

The polarization, i.e., in particular the proportion of p- and s-polarized radiation, is determined at one point of the HUD region, preferably in the geometric center of the HUD region. Since windshields are usually curved, thus affecting the plane of incidence of the projector radiation, slightly deviating polarization proportions can occur in the remaining regions, which is unavoidable for physical reasons.

The radiation of the projector preferably strikes the windshield with an angle of incidence from 45° to 70°, in particular from 60° to 70°. In an advantageous embodiment, the angle of incidence deviates from Brewster's angle by at most 10°. The p-polarized radiation is then reflected only insignificantly at the surfaces of the windshield such that no ghost image is generated. The angle of incidence is the angle between the vector of incidence of the projector radiation and the interior-side surface normal (i.e., the surface normal on the interior-side external surface of the windshield) in the geometric center of the HUD region. Brewster's angle for an air/glass transition in the case of soda lime glass, which is commonly used for window panes, is 56.5°. Ideally, the angle of incidence should be as close as possible to this Brewster's angle. However, angles of incidence of 65°, which are common for HUD projection assemblies, are easily implemented in vehicles and which deviate only slightly from Brewster's angle can, for example, also be used such that the reflection of the p-polarized radiation increases only insignificantly.

Since the reflection of the projector radiation occurs substantially at the reflection coating and not at the external pane surfaces, it is not necessary to arrange the external pane surfaces at an angle relative to one another in order to avoid ghost images. The external surfaces of the windshield are, consequently, preferably arranged substantially parallel to one another. The thermoplastic intermediate layer is preferably not implemented wedge-like, but, instead, has a substantially constant thickness, in particular even in the vertical course between the upper edge and the lower edge of the windshield, just like the inner pane and the outer pane. A wedge-like intermediate layer would, in contrast, have a variable thickness, in particular an increasing thickness, in the vertical course between the lower edge and the upper edge of the windshield. The intermediate layer is typically formed from at least one thermoplastic film. Since standard films are significantly more economical than wedge films, the production of the windshield is more economical.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and the thermoplastic intermediate layer can be clear and colorless, but also tinted or colored. In a preferred embodiment, the total transmittance through the windshield (including the reflection coating) is greater than 70%. The term "total transmittance" is based on the process for testing the light permeability of motor vehicle windows specified by ECE-R 43, Annex 3, § 9.1. The outer pane and the inner panes can, independently of one another, be non-toughened, partially toughened, or toughened. If at least one of the panes is to be toughened, this can be thermal or chemical toughening.

In an advantageous embodiment, the outer pane is tinted or colored. This can reduce the exterior-side reflectivity of the windshield, making the impression of the pane more pleasing for an outside viewer. However, in order to ensure light transmittance of preferably at least 70% for windshields (total transmittance), the outer pane should preferably have light transmittance of at least 80%, particularly preferably of at least 85%. The inner pane and the intermediate layer are preferably clear, i.e., not tinted or colored. For example, green or blue colored glass can be used as the outer pane. The light transmittance describes the proportion of radiation in the visible spectrum striking the pane at an angle of incidence of 0° relative to the surface normal that passes through the window. It can, for example, be determined with the spectrometer "Lambda 900" from the company Perkin Elmer.

The windshield is preferably curved in one or a plurality of spatial directions, as is customary for motor vehicle panes, wherein typical radii of curvature are in the range from approx. 10 cm to approx. 40 m. The windshield can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film, in particular based on PVB, EVA, or PU. This means that the film consists for the most part of said polymer (content greater than 50 wt-%). Besides the polymer, the film can contain further additives, in particular plasticizers. The thickness of the intermediate layer is preferably from 0.2 mm to 2 mm, particularly preferably from 0.3 mm to 1 mm.

The windshield is can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The reflection coating and the emissivity-reducing coating are preferably applied to the respective pane surfaces by physical vapor deposition (PVD), particularly preferably by cathodic sputtering ("sputtering"), most particularly preferably by magnetron-enhanced cathodic sputtering ("magnetron sputtering"). In principle, however, the coatings can also be applied, for example, by chemical vapor deposition (CVD), for example, plasma-enhanced chemical vapor deposition (PECVD), by vapor deposition, or by atomic layer deposition (ALD).

The coatings are preferably applied prior to lamination. Instead of applying the reflection coating to a pane surface, it can, in principle, also be provided on a carrier film arranged in the intermediate layer.

If the windshield is to be bent, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the reflection coating.

The invention further includes the use of a projection assembly according to the invention as an HUD in a motor vehicle, in particular in a passenger car or a truck.

In the following, the invention is explained in detail with reference to drawings and exemplary embodiments. The drawings are schematic representations and are not true to scale. The drawings in no way restrict the invention.

Figure 2:
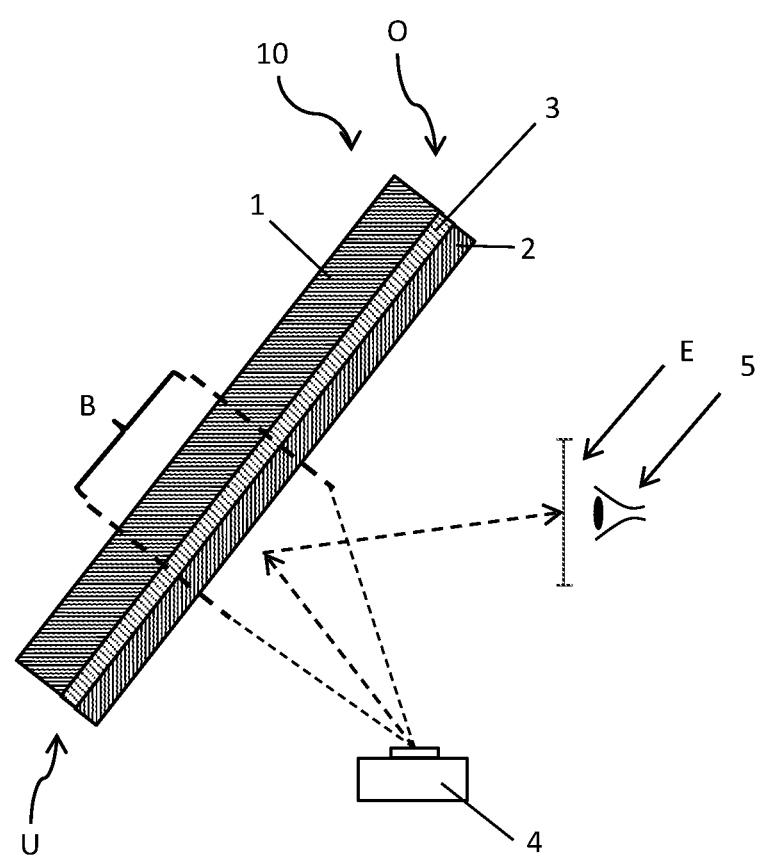
Figure 3:
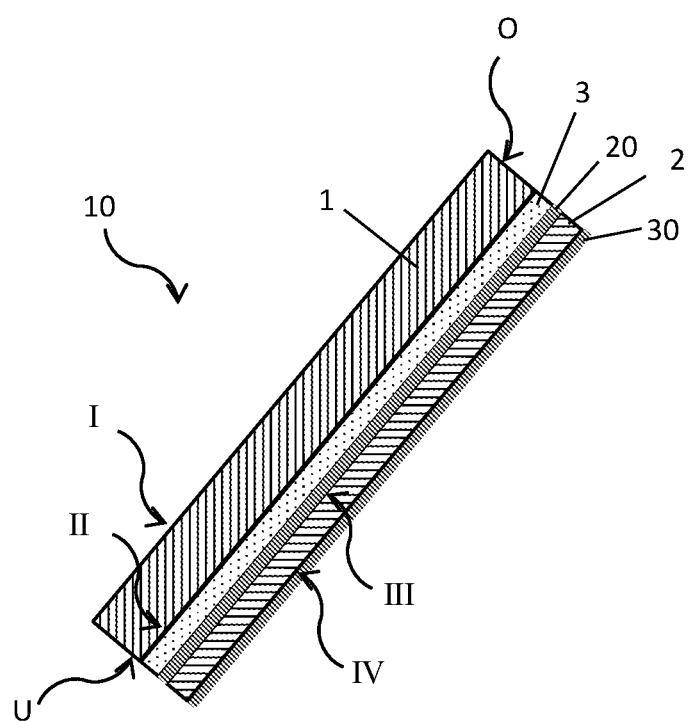
Figure 4:
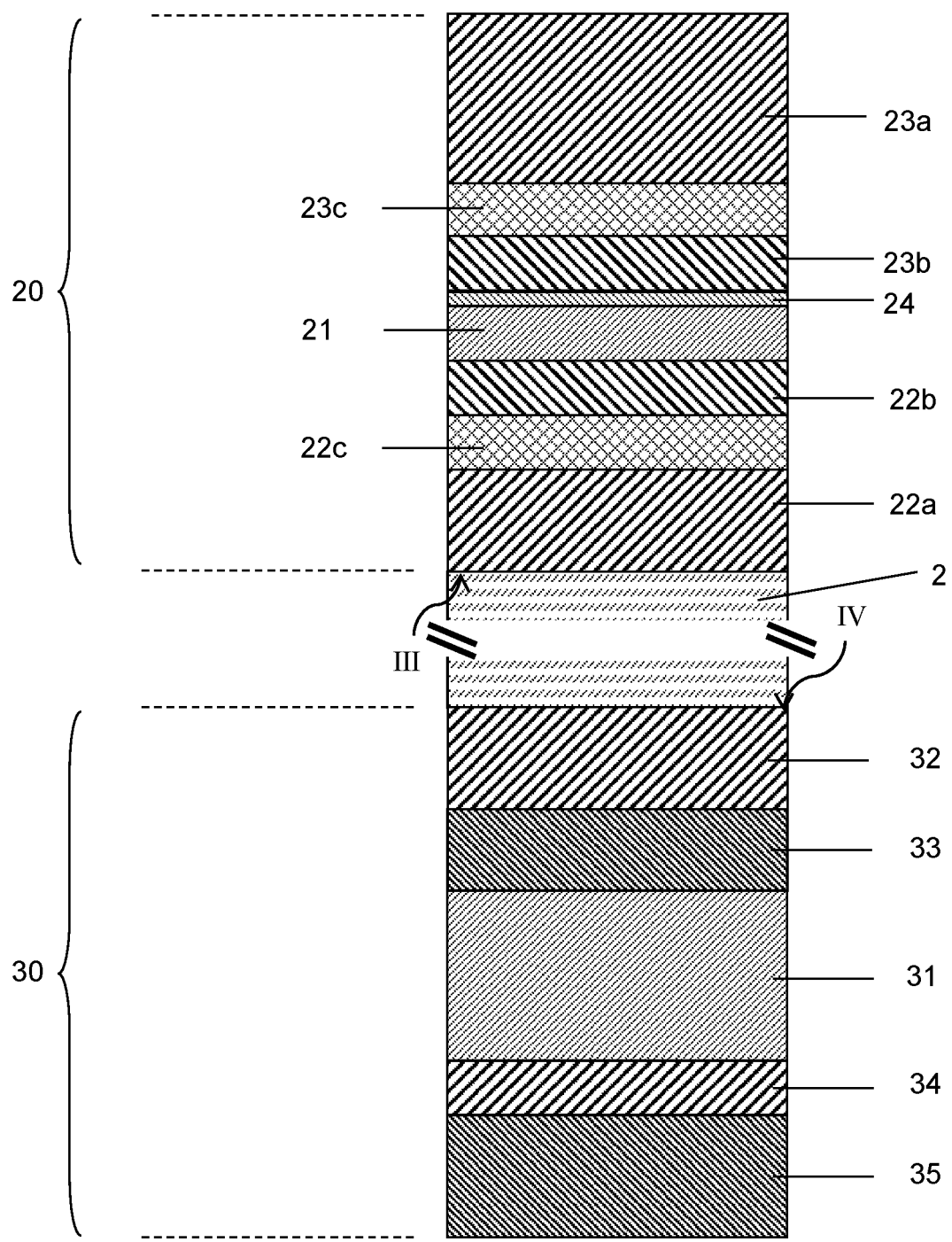
Figure 5:
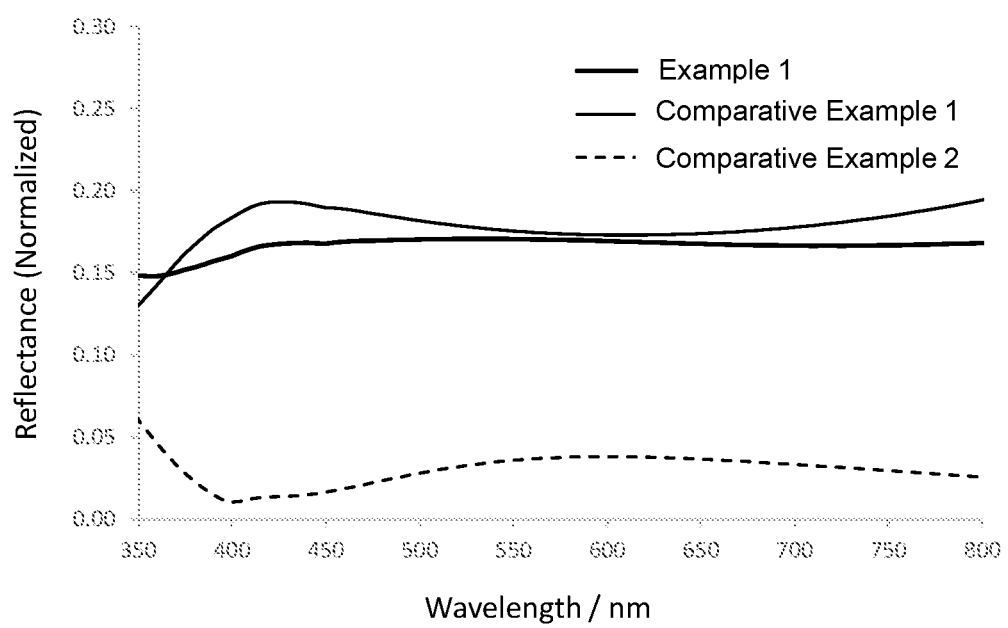

THEY DEPICT:

FIG. 1 a plan view of a composite pane of a generic projection assembly,

FIG. 2 a cross-section through a generic projection assembly,

FIG. 3 a cross-section through a composite pane of a projection assembly according to the invention, FIG. 4 a cross-section through an embodiment of the reflection coating and emissivity-reducing coating according to the invention on an inner pane, FIG. 5 reflection spectra of composite panes for p-polarized radiation of the Example and the Comparative Examples 1 and 2.

FIG. 1 and FIG. 2 depict in each case a detail of a generic projection assembly for an HUD. The projection assembly comprises a windshield 10, in particular the windshield of a passenger car. The projection assembly also comprises a projector 4 that is directed at a region of the composite pane 10. In this region, commonly referred to as HUD region B, the projector 4 can generate images that are perceived by a viewer 5 (vehicle driver) as virtual images on the side of the composite pane 10 facing away from him if his eyes are situated within the so-called eyebox E.

The windshield 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the external surroundings; the inner pane 2, the vehicle interior.

FIG. 3 depicts an embodiment of a windshield 10 implemented according to the invention. The outer pane 1 has an exterior-side surface I that, in the installed position, faces the external surroundings, and an interior-side surface II that, in the installed position, faces the interior. Likewise, the inner pane 2 has an exterior-side surface III that, in the installed position, faces the external surroundings, and an interior-side surface IV that, in the installed position, faces the interior. The outer pane 1 and the inner pane 2 are made, for example, of soda lime glass and have a thickness of 2.1 mm. The intermediate layer 3 is made, for example, of a PVB film with a thickness of 0.76 mm. The PVB film has an essentially constant thickness, apart from any surface roughness common in the art—it is not implemented as a so-called "wedge film".

The exterior-side surface III of the inner pane 2 is provided with a reflection coating 20 according to the invention, which is provided as a reflection surface for the projector radiation (and, possibly, additionally, as an IR-reflecting coating).

The radiation of the projector 4 is p-polarized according to the invention, in particular essentially purely p-polarized. Since the projector 4 irradiates the windshield 10 at an angle of incidence of about 65°, which is close to Brewster's angle, the radiation of the projector is only insignificantly reflected at the external surfaces I, IV of the composite pane 10. In contrast, the reflection coating 20 according to the invention is optimized for reflection of p-polarized radiation. It serves as a reflection surface for the radiation of the projector 4 to generate the HUD projection.

The interior-side surface IV of the inner pane 2 is provided with an emissivity-reducing coating according to the invention. Such emissivity-reducing coatings 30 increases the thermal comfort in the interior of the vehicle by reflecting thermal radiation. Surprisingly, the presence of the emissivity-reducing coating 30 also results in an improvement of the reflection properties for the p-polarized radiation of the projector 4 such that an improved display of the HUD image is achieved.

FIG. 4 depicts the layer sequence of embodiments of the reflection coating 20 according to the invention and the emissivity-reducing coating 30 according to the invention. The reflection coating 20 and the emissivity-reducing coating 30 are stacks of thin layers. The reflection coating 20 includes an electrically conductive layer 21 based on silver. A metallic blocking layer 24 is arranged directly above the electrically conductive layer 21. Above that, an upper dielectric layer sequence is arranged, consisting, from bottom to top, of an upper matching layer 23b, an upper refractive-index-enhancing layer 23c, and an upper antireflection layer 23a. Arranged below the electrically conductive layer 21 is a lower dielectric layer sequence, consisting, from top to bottom, of a lower matching layer 22b, a lower refractive-index-enhancing layer 22c, and a lower antireflection layer 22a.

The layer structure shown is to be construed only by way of example. The dielectric layer sequences can also include more or fewer layers. The dielectric layer sequences also do not have to be symmetrical. Exemplary materials and layer thicknesses can be found in the following Example.

The emissivity-reducing coating 30 includes an electrically conductive layer 31 based on indium tin oxide (ITO). Arranged below the electrically conductive layer 31 is, first, a blocking layer 32 against alkali diffusion; and, above that, a lower antireflection layer 33. Arranged above the electrically conductive layer 31 is, first, a barrier layer 34 for regulating oxygen diffusion and an upper antireflection layer 35. The layer structure shown is, again, to be construed only by way of example. Exemplary materials and layer thicknesses can be found in the following Example.

The layer sequences of a windshield 10 with the reflection coating 20 on the exterior-side surface III of the inner pane 2 and the emissivity-reducing coating 30 on the interior-side surface IV of the inner pane 2 in accordance with an Example according to the invention, together with the materials and geometric layer thicknesses of the individual layers are presented in Table 1. Independent of one another, the dielectric layers can be doped, for example, with boron or aluminum. The materials also need not be deposited stoichiometrically, but can deviate from the stoichiometrics of the empirical formulas indicated. For comparison, two Comparative Examples are presented in Table 1. In Comparative Example 1, the windshield 10 has only the reflection coating 20; in Comparative Example 2, only the emissivity-reducing coating 30.

TABLE 1

| Material | Reference Character | | Layer Thickness Example | Comp. Example 1 | Comp. Example 2 |
|---|---|---|---|---|---|
| Soda lime glass | 1 | | 2.1 mm | 2.1 mm | 2.1 mm |
| PVB | 3 | | 0.76 mm | 0.76 mm | 0.76 mm |
| $Si_3N_4$ | 20 | 23a | 65 nm | 65 nm | — |
| SiZrN | | 23c | 10 nm | 10 nm | — |
| ZnO | | 23b | 10 nm | 10 nm | — |
| NiCr | | 24 | 0.3 nm | 0.3 nm | — |
| Ag | | 21 | 11 nm | 11 nm | — |
| ZnO | | 22b | 10 nm | 10 nm | — |
| SiZrN | | 22c | 10 nm | 10 nm | — |
| $Si_3N_4$ | | 22a | 25 nm | 25 nm | — |
| Soda lime glass | 2 | | 2.1 mm | 2.1 mm | 2.1 mm |
| $Si_3N_4$ | 30 | 32 | 30 nm | | 30 nm |
| $SiO_2$ | | 33 | 20 nm | | 20 nm |
| ITO | | 31 | 70 nm | | 70 nm |
| $Si_3N_4$ | | 34 | 9 nm | | 9 nm |
| $SiO_2$ | | 35 | 50 nm | | 50 nm |

The optical thicknesses of the dielectric layer sequences can be calculated as the product of the indicated geometric thicknesses and the refractive index ($Si_3N_4$: 2.0; SiZrN: 2.2, ZnO: 2.0; $SiO_2$: 1.5).

FIG. 5 depicts reflection spectra of windshields 10 as in FIG. 3, with, in each case, a layer structure in accordance with the Example according to the invention as well as the Comparative Examples 1 and 2 of Table 1. The reflection spectra were recorded with a light source that emits p-polarized radiation of uniform intensity in the spectral range observed, when irradiated via the inner pane 2 (the so-called interior-side reflection) at an angle of incidence of 65° relative to the interior-side surface normal. The reflection measurement is thus approximated to the situation in the projection assembly.

From the graphic representation of the spectra, it is already apparent that the Example according to the invention has a reflection spectrum that is improved compared to the Comparative Examples. In the Comparative Example 1, similar reflectance is achieved, but the reflection spectrum is less constant ("flat") such that the HUD display is less color-neutral, because, in particular, the blue components are reflected with more intensity. Also, the optical appearance of the windshield 10 can have a color cast. The Comparative Example 2 does not result in sufficiently high reflectance for the high-intensity display of an HUD projection.

For the evaluation of the HUD display, the spectral range from 450 nm to 650 nm is of particular interest, since conventional HUD projectors 4 use radiation in this range (RGB: 473 nm, 550 nm, 630 nm). The averaged reflectance for p-polarized radiation as well as the differences of the maximum and minimum values relative to the averaged reflectance in the spectral range are summarized in Table 2. Also, the standard deviation of the reflection spectrum is indicated in each case.

TABLE 2

|  | Example | Comp. Example 1 | Comp. Example 2 |
| --- | --- | --- | --- |
| Averaged reflectance for p-polarized radiation, 450 nm-650 nm | 17.0% | 17.8% | 3.2% |
| Difference between the maximally occurring reflectance and the mean | 0.1% | 1.2% | 0.6% |
| Difference between the minimally occurring reflectance and the mean | 0.2% | 0.5% | 1.6% |
| Standard deviation, 450 nm-650 nm | 0.09% | 0.55% | 0.68% |

As could already be seen from the graphic representation of the reflection spectra in FIG. 5, the Comparative Example 1 results in an averaged reflectance similar to that of the Example according to the invention but in a greater variance in reflectance. The HUD display is thus similarly intense, but less color-neutral. The Comparative Example 2 has an averaged reflectance that is much too low.

For the evaluation of the overall optical impression of the windshield 10, the entire visible spectral range from 380 nm to 780 nm is of interest. The averaged reflectance for p-polarized radiation as well as the differences of the maximum and minimum values relative to the reflectance in this spectral range are summarized in Table 3. Also, the standard deviation of the reflection spectrum is indicated in each case.

TABLE 3

|  | Example | Comp. Example 1 | Comp. Example 2 |
| --- | --- | --- | --- |
| Averaged reflectance for p-polarized radiation, 380 nm-780 nm | 16.8% | 18.0% | 2.9% |
| Difference between the maximally occurring reflectance and the mean | 0.3% | 1.3% | 0.9% |
| Difference between the minimally occurring reflectance and the mean | 1.4% | 1.3% | 1.9% |
| Standard deviation, 380 nm-780 nm | 0.33% | 0.66% | 0.86% |

As could already be seen from the graphic representation of the reflection spectra in FIG. 5, the example according to the invention resulted in a lower variance of reflectance. The overall optical impression is, consequently, color-neutral; a disturbing color cast can be avoided. All panes have light transmittance greater than 70% such that they can be used as a windshield.

LIST OF REFERENCE CHARACTERS

(10) windshield
(1) outer pane
(2) inner pane
(3) thermoplastic intermediate layer
(4) projector
(5) viewer/vehicle driver
(20) reflection coating
(21) electrically conductive layer based on silver (silver layer)
(22a) first lower dielectric layer/antireflection layer
(22b) second lower dielectric layer/matching layer
(22c) third lower dielectric layer/refractive-index-enhancing layer
(23a) first upper dielectric layer/antireflection layer
(23b) second upper dielectric layer/matching layer
(23c) third upper dielectric layer/refractive-index-enhancing layer
(24) metallic blocking layer
(30) emissivity-reducing coating
(31) electrically conductive layer based on a TCO (TCO layer)
(32) blocking layer against alkali diffusion
(33) lower antireflection layer
(34) barrier layer for regulating oxygen diffusion
(35) upper antireflection layer
(O) upper edge of the windshield 10
(U) lower edge of the windshield 10
(B) HUD region of the windshield 10
(E) eyebox
(I) exterior-side surface of the outer pane 1, facing away from the intermediate layer 3
(II) interior-side surface of the outer pane 1, facing the intermediate layer 3
(III) exterior-side surface of the inner pane 2, facing the intermediate layer 3
(IV) interior-side surface of the inner pane 2, facing away from the intermediate layer 3

The invention claimed is:

1. A projection assembly for a head-up display (HUD), comprising:
    a windshield, comprising an outer pane and an inner pane that are joined to one another via a thermoplastic intermediate layer, having a HUD region; and
    a projector that is directed at the HUD region and that is adapted to emit p-polarized radiation;
    wherein
    a reflection coating is arranged on a surface of the outer pane or of the inner pane facing the thermoplastic intermediate layer or within the thermoplastic intermediate layer, which reflection coating is suitable for reflecting p-polarized radiation and which has exactly one electrically conductive layer based on silver;
    an emissivity-reducing coating is arranged on a surface of the inner pane facing away from the thermoplastic intermediate layer, which emissivity-reducing coating has an electrically conductive layer based on a transparent conductive oxide,
    wherein the emissivity-reducing coating comprises
        a blocking layer against alkali diffusion with a refractive index of at least 1.9,
        above the blocking layer, a dielectric lower antireflection layer with a refractive index from 1.3 to 1.8,
        above the dielectric lower antireflection layer, the electrically conductive layer,
        above the electrically conductive layer, a dielectric barrier layer for regulating oxygen diffusion with a refractive index of at least 1.9, and
        above the dielectric barrier layer, a dielectric upper antireflection layer with a refractive index from 1.3 to 1.8.
2. The projection assembly according to claim 1, wherein the reflection coating is implemented such that below the electrically conductive layer, a lower dielectric layer or lower dielectric layer sequence is arranged, whose refractive index is at least 1.9, and above the electrically conductive layer, an upper dielectric layer or upper dielectric layer sequence is arranged, whose refractive index at least 1.9, wherein a ratio of an optical thickness of the upper dielectric layer or upper dielectric layer sequence to an optical thickness of the lower dielectric layer or lower dielectric layer sequence is at least 1.7.

3. The projection assembly according to claim 2, wherein the optical thickness of the upper dielectric layer or upper dielectric layer sequence is from 100 nm to 200 nm and the optical thickness of the lower dielectric layer or lower dielectric layer sequence is from 50 nm to 120 nm.

4. The projection assembly according to claim 1, wherein the electrically conductive layer of the reflection coating has a geometric thickness from 10 nm to 14 nm.

5. The projection assembly according to claim 1, wherein
below the electrically conductive layer of the reflection coating, a first lower dielectric layer, a second lower dielectric layer, and a third lower dielectric layer, with a refractive index of at least 1.9 are arranged, and/or
above the electrically conductive layer of the reflection coating, a first upper dielectric layer, a second upper dielectric layer, and a third upper dielectric layer, with a refractive index of at least 1.9 are arranged.

6. The projection assembly according to claim 5, wherein the reflection coating comprises the following layers:
an antireflection layer based on silicon nitride with a thickness from 20 nm to 30 nm,
above the antireflection layer, a refractive-index-enhancing layer based on mixed silicon-zirconium nitride or mixed silicon-hafnium nitride with a thickness from 8 nm to 12 nm,
above the refractive-index-enhancing layer, a matching layer based on zinc oxide with a thickness from 8 nm to 12 nm,
above the matching layer, the electrically conductive layer with a thickness from 11 nm to 13 nm,
above the electrically conductive layer, a blocking layer based on Ti or NiCr with a thickness from 0.1 nm to 0.5 nm,
above the blocking layer, an upper matching layer based on zinc oxide with a thickness from 8 nm to 12 nm,
above the upper matching layer, an upper refractive-index-enhancing layer based on mixed silicon-zirconium nitride or mixed silicon-hafnium nitride with a thickness from 8 nm to 12 nm, and
above the upper refractive-index-enhancing layer, an upper antireflection layer based on silicon nitride with a thickness from 60 nm to 70 nm.

7. The projection assembly according to claim 5, wherein
the first lower dielectric layer is based on silicon nitride, the second lower dielectric layer is based on zinc oxide, and the third lower dielectric layer is based on a mixed silicon-metal nitride, and/or
the first upper dielectric layer is based on silicon nitride, the second upper dielectric layer is based on zinc oxide, and the third upper dielectric layer is based on a mixed silicon-metal nitride.

8. The projection assembly according to claim 7, wherein the third lower dielectric layer is a mixed silicon-zirconium nitride layer or a mixed silicon-hafnium nitride layer and/or the third upper dielectric layer is a mixed silicon-zirconium nitride layer or mixed silicon-hafnium nitride layer.

9. The projection assembly according to claim 1, wherein the reflection coating includes at least one metallic blocking layer that is arranged directly above and/or below the electrically conductive layer and has a geometric thickness of less than 1 nm.

10. The projection assembly according to claim 1, wherein the electrically conductive layer of the emissivity-reducing coating is based on indium tin oxide and has a thickness from 50 nm to 130 nm.

11. The projection assembly according to claim 10, wherein the thickness is from 60 nm to 100 nm.

12. The projection assembly according to claim 1, wherein
the lower antireflection layer and the upper antireflection layer are based on an oxide,
the lower antireflection layer has a thickness from 5 nm to 50 nm, and
the upper antireflection layer has a thickness from 10 nm to 100 nm.

13. The projection assembly according to claim 12, wherein the lower antireflection layer and the upper antireflection layer are based on a silicon oxide.

14. The projection assembly according to claim 1, wherein the barrier layer is based on a nitride or a carbide, and has a thickness from 5 nm to 20 nm.

15. The projection assembly according to claim 14, wherein the nitride is silicon nitride and the carbide is silicon carbide.

16. The projection assembly according to claim 1, wherein the blocking layer is based on a nitride, and has a thickness from 10 nm to 50 nm.

17. The projection assembly according to claim 1, wherein the windshield has a region, in which the thermoplastic intermediate layer is tinted or colored.

18. The projection assembly according to claim 1, wherein the outer pane is tinted or colored and has light transmittance of at least 80%.

19. The projection assembly according to claim 1, wherein external surfaces of the windshield are arranged substantially parallel to one another.

* * * * *